(12) United States Patent
Kennamer

(10) Patent No.: US 6,476,532 B1
(45) Date of Patent: Nov. 5, 2002

(54) MAGNETOSTRICTIVE-COMPENSATED CORE OF ELECTROMAGNETIC DEVICE

(75) Inventor: Donald E. Kennamer, Virginia Beach, VA (US)

(73) Assignees: Newport News Shipbuilding, Newport News, VA (US); Dry Dock Company, Newport News, VA (US)

( * ) Notice: Subject to any disclaimer, the term of this patent is extended or adjusted under 35 U.S.C. 154(b) by 0 days.

(21) Appl. No.: 09/222,476

(22) Filed: Dec. 29, 1998

(51) Int. Cl.$^7$ .................................................. H02K 1/28
(52) U.S. Cl. ........................................ 310/218; 335/215
(58) Field of Search ...................... 428/694 T, 694 TM; 310/216, 218; 335/296–299, 215

(56) References Cited

U.S. PATENT DOCUMENTS

| | | | |
|---|---|---|---|
| 2,456,982 A | | 12/1948 | Moore |
| 3,634,742 A | | 1/1972 | Edson |
| 3,652,889 A | * | 3/1972 | Reece et al. ................. 310/258 |
| 3,753,058 A | | 8/1973 | Edson |
| 4,214,221 A | * | 7/1980 | Sowter et al. ............... 335/210 |
| 4,622,460 A | * | 11/1986 | Failes et al. ................. 250/227 |
| 4,912,353 A | * | 3/1990 | Kondo et al. ................ 310/259 |
| 5,091,666 A | * | 2/1992 | Jarcznski ...................... 310/54 |
| 5,172,020 A | | 12/1992 | Hibino et al. |
| 5,185,547 A | * | 2/1993 | Carbonell et al. ........... 310/259 |
| 5,420,471 A | | 5/1995 | Yun |
| 5,777,537 A | * | 7/1998 | Allen et al. .................... 336/96 |
| 5,900,796 A | * | 5/1999 | Parker .......................... 336/92 |
| 5,969,457 A | * | 10/1999 | Clifton et al. ............... 310/216 |

* cited by examiner

*Primary Examiner*—Lincoln Donovan
(74) *Attorney, Agent, or Firm*—Hunton & Williams

(57) ABSTRACT

The present invention eliminates vibration of an electromagnetic device, apparatus or machine caused by magnetostrictive and Joule effects. Specifically, the present invention discloses making an electromagnetic device, apparatus or machine with magnetostrictive contracting and magnetostrictive expanding materials. Once exposed to a magnetic field, the amount of contraction and expansion of the materials should be virtually the same to minimize generation of vibratory energy that can be transmitted from a core to a housing.

50 Claims, 3 Drawing Sheets

MAGNETOSTRICTIVE-COMPENSATED CORE OF ELECTROMAGNETIC DEVICE

RELATED APPLICATIONS

This application is a RCE application of 09/222,476, filed Dec. 29, 1988.

BACKGROUND OF THE INVENTION

Magnetostrictive effect is a term describing a change in the size of a magnetic substance upon exposure to an external magnetic field. Joule effect is a term describing a change in the length of a ferromagnetic substance, in a direction parallel to an externally applied magnetic field. All electromagnetic devices, apparatuses and machines are subject to the magnetostrictive effect and the Joule effect.

For a specific example, the magnetic field in an electromagnetic device, apparatus and machine causes a net change in the size of a core thus generating vibratory energy, which vibratory energy may consequently cause unwanted noise and premature component fatigue leading to part failures.

There are several patents addressing the issues of the magnetostrictive effect and the Joule effect, which patents are discussed in some detail hereinbelow.

Hibino et al. discloses a Magnetic Core for AC Electrical Equipments (U.S. Pat. No. 5,172,020). This reference purportedly attempts to deal with harmonic fluxes, distorting electric fields, frequency fluxes and electromagnetic noises. It teaches using a high silicon steel and a low silicon steel as lamination materials. Both materials are known to expand under the influence of electromagnetic field, but one expands at a greater rate than the other.

Yun discloses an Electric Generator Utilizing Minimal Mechanical Power (U.S. Pat. No. 5,420,471). This patent mainly teaches alternately laminating ferromagnetic and non-ferromagnetic materials together to form a stator core of a generator, for the purpose of achieving a weak magnetic field so that it would be easy to turn a rotor of the generator. Yun has not disclosed eliminating vibrations caused by magnetostrictive effect or preventing any magnetic field leakage.

Moore discloses a Motor Control (U.S. Pat. No. 2,456, 982). This patent mainly discloses using a motor controller to control a furnace. It has not disclosed or taught any concerns over magnetostrictive expansion, physical vibration, or magnetic leakage. The only pertinent aspect of Moore is the disclosure of alternately laminating different materials, each with different widths to poles N1 and S1, as shown in FIG. 3. However in Moore, this is done for the purpose of increasing reluctance, thus, torque of the motor.

Edson discloses an Operation of Magnetostrictive Apparatus (U.S. Pat. No. 3,753,058) and a Magnetostrictive Apparatus and Process (U.S. Pat. No. 3,634,742). Both patents teach using magnetostrictive material to increase the amount of material expansion and contraction for the purpose of inducing physical vibration. There is no disclosure or teaching of eliminating physical vibrations.

SUMMARY OF THE INVENTION

The present invention teaches laminating a magnetostrictive contracting material with a magnetostrictive expanding material so that the virtually equal amount of contraction and expansion will prevent or minimize the generation of vibratory energy and noise when the cores made of these materials are subjected to a magnetic field.

DETAILED DESCRIPTION OF THE INVENTION

The present invention attempts to minimize vibrations caused by magnetostrictive effect of an electromagnetic device, apparatus or machine. Due to the cycles of physical expansion and contraction caused by the magnetostrictive effect, vibrations among various parts of an electromagnetic device, apparatus or machine may occur, resulting in the generation of vibratory energy leading to unwanted noise and premature component fatigue of various parts.

For example, when a change of a magnetic field causes magnetostrictive expansion and contraction of a core, vibratory energy is generated by the core. The vibratory energy may then be transmitted from the core to various other parts and the housing of the core.

To overcome these shortcomings, the present invention discloses selectively laminating magnetostrictive materials, separately comprising, for example, iron in the form of steel and nickel. Ideally,, the amount of magnetostrictive expansion of iron would be essentially the same as the amount of magnetostrictive contraction of nickel, so that a core made of these materials undergoes no net change in size, or at the most, only a slight contraction.

Figure 1:
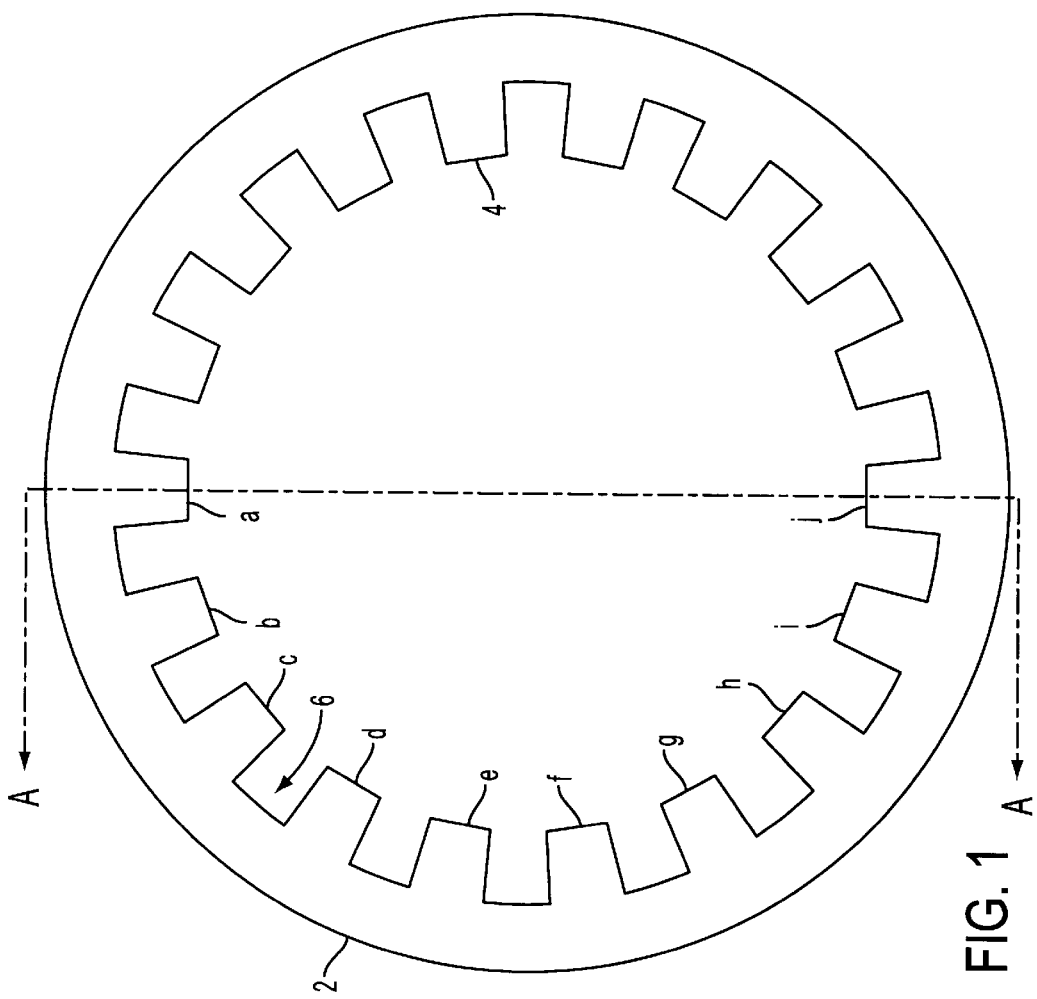
FIG. 1 shows a front view of a first embodiment of a core.

A first embodiment of the present invention by way of an example is shown in FIG. 1. This figure shows a core 2 having a circular shape with an external boundary and an internal boundary. The internal boundary of the core 2 comprises a plurality of equally spaced teeth a–j on the left-hand side as well as other teeth on the right hand side inclusively designated as teeth 4. In-between the teeth are a plurality of slots 6 for windings (not shown).

Figure 2:
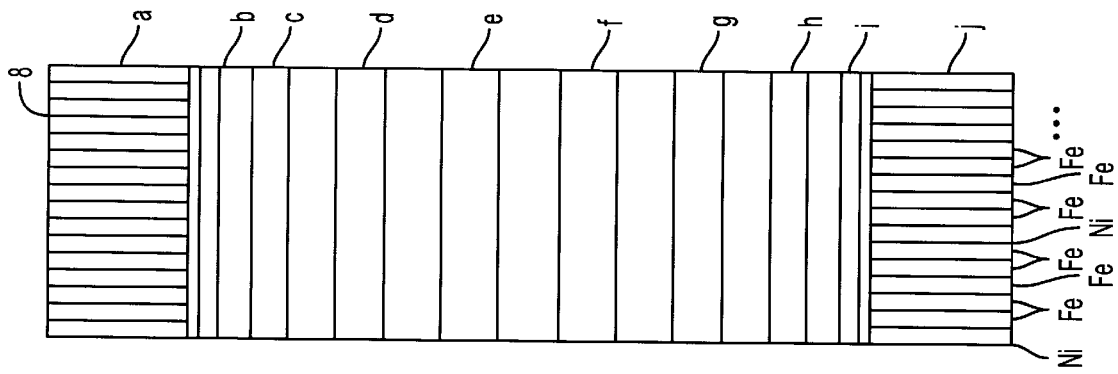
FIG. 2 shows a cross-section view of the first embodiment of the core.

The present invention is also shown by way of an example in FIG. 2. This is a cross-section view of the core 2 along line A—A of FIG. 1. The core 2 comprises a plurality of plates 8 each having either an equal or an unequal thickness being selectively laminated together. These plates may, for example, include either iron in the form of steel or nickel. Other magnetostrictive materials may also be used.

Regardless of which types of magnetostrictive materials are used, they should have complementary characteristics of contraction and expansion, such that when one magnetostrictive material contracts, the other magnetostrictive material expands. The contraction and expansion actions are self-synchronizing since they are exposed to the same electromagnetic field. Magnetostrictive effect is independent of the direction of the electromagnetic field; therefore, there is a natural "rectifying" action.

In terms of different rates of contraction and expansion between different magnetostrictive materials, the amount of magnetostrictive material may be increased or decreased depending upon the desired design result. It is suggested that the overall action be scaled such that the amount of contraction is slightly more than the amount of expansion, or the amount of expansion is slightly less than the amount of contraction. This complimentary characteristic would either eliminate or minimize the generation of vibratory energy, in addition to reducing transmission of vibratory energy.

For example, in the context of an electric motor, an alternator or a generator, this means when the magnetic field is at its maximum strength, a core would be slightly smaller than normal. This net shrinkage slightly de-couples the core from its housing structure, thus, reducing the transmission of vibratory energy from the core to its surrounding.

As noted above, the first set of preferred magnetostrictive materials are iron in the form of steel and nickel. A second set of preferred magnetostrictive materials are Permalloy 45 and nickel. A third set of preferred magnetostrictive materials are iron and B/Bg 45 Permalloy.

Figure 4:
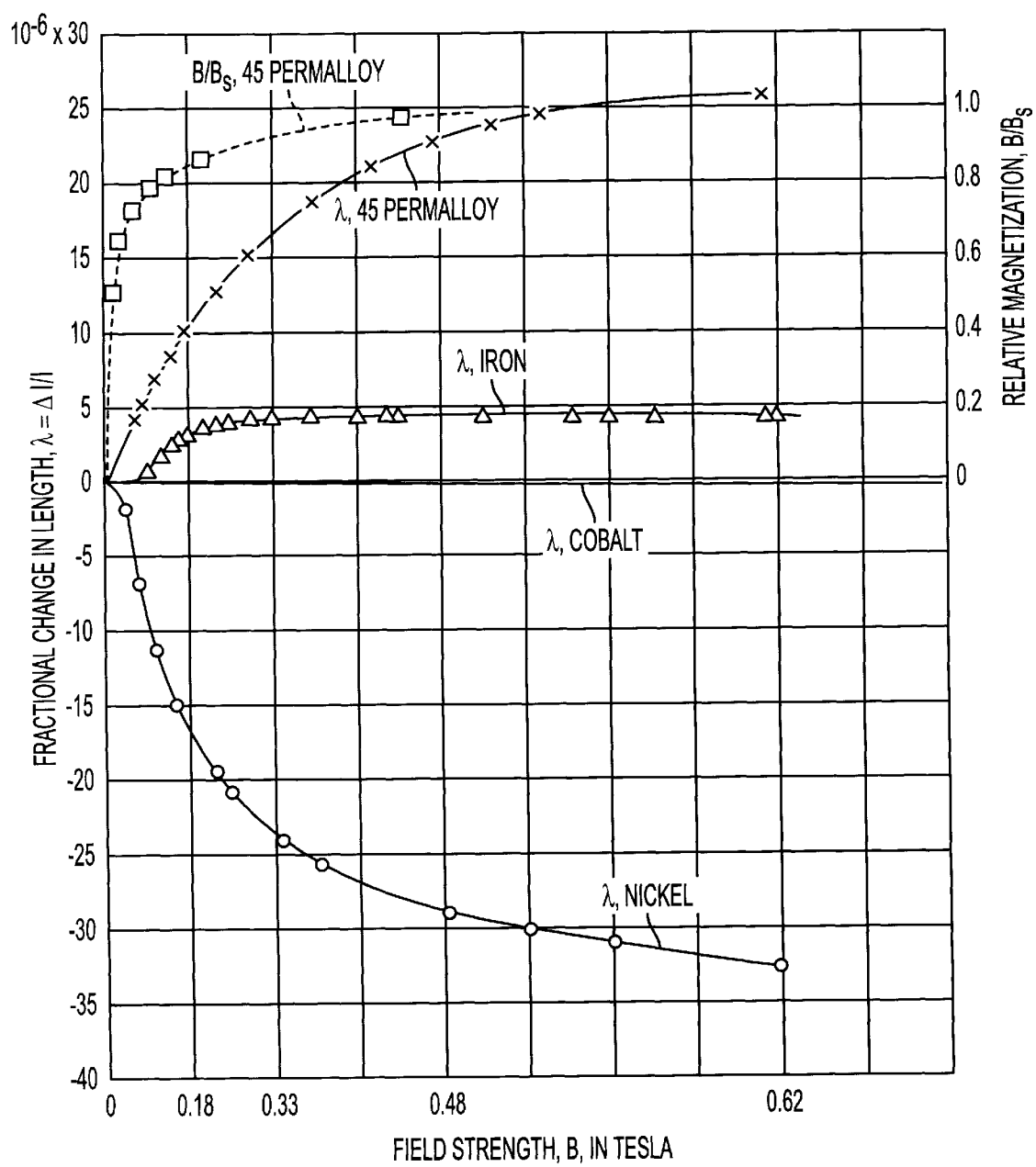
FIG. 4 shows a chart illustrating the characteristics of several common magnetostrictive materials.

According to the chart showing the magnetostrictive characteristic of several common magnetostrictive materials in FIG. 4, it is shown that nickel has a relatively large contraction rate, whereas iron, 45 permalloy and B/Bg 45 permalloy would each have a respectively escalating expansion rate but even the highest expansion rate is less than the contraction rate of nickel. Determining which set of magnetostrictive materials to be used depends on the desired end-results.

Based on this chart, cobalt is a material that is least sensitive to the magnetostrictive effect, as it is shown to be very stable under a broad range of magnetic field strengths. However, cobalt is both cost prohibitive and lacks structural strength to be used for many electromagnetic devices, apparatuses or machines.

FIG. 2 shows, by way of an example, how the two complementary materials of iron in the form of steel and nickel might be deployed. For each layer of nickel, five layers of iron in the form of steel are used in the lamination. This would equalize the larger magnetostrictive characteristic in nickel over iron. Alternatively, the layers might simply alternate but the layer of iron in the form of steel could be five times thicker than the layer of nickel.

Figure 3:
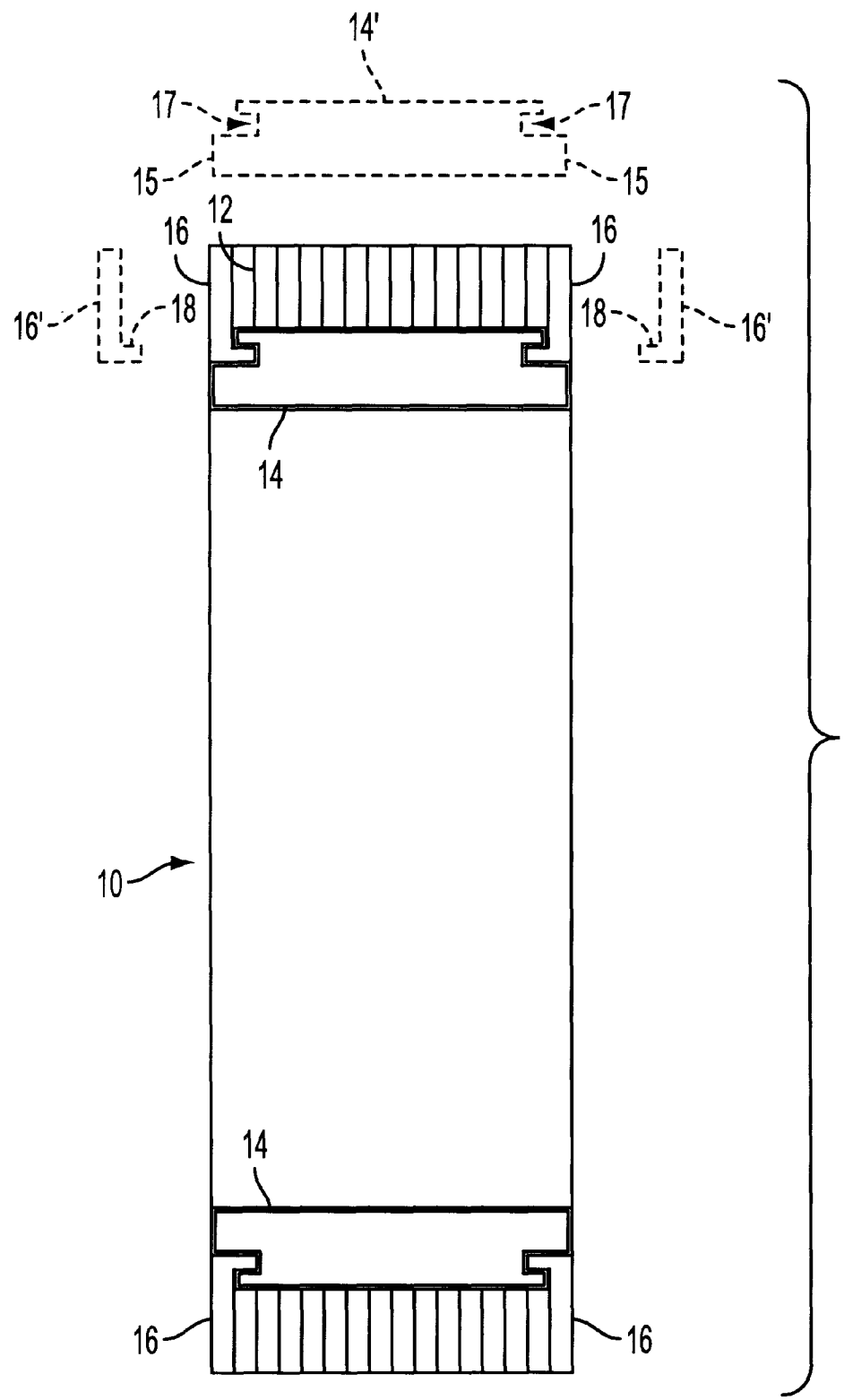
FIG. 3 shows a cross-section view of a second embodiment of a core.

A second embodiment of the present invention is shown as an example in FIG. 3. This diagram depicts a cross-section view of a core 10 similar to that shown in FIG. 2. This core comprises a plurality of laminated plates 12 forming the main block of the core 10. Unlike the first embodiment, these plates 12 are made of a first type of magnetostrictive material. Separately attached to the core 10 is a plurality of teeth 14. These teeth are made of a second type of magnetostrictive material. As an example, the first and second types of magnetostrictive materials correspondingly could be iron in the form of steel and nickel, or vice versa.

One of teeth 14' that has not been attached to core 10 is shown in dashed lines by way of an example to have a substantially rectangular configuration wherein two short edges 15 each contains a groove 17. To install teeth 14 onto the core 10, a plurality of L-shape couplers 16 are used. One of couplers 16' that has not been attached to the core 10 is shown in dashed lines by way of an example to have a tongue 18 mated for groove 17. Tongue 18 of coupler 16 engages groove 17 of teeth 14, which coupler 16 is then attached to the core 10 to secure the teeth 14 onto the core 10. Conventional means will be used to fasten the couplers 16 to the main block 12, including the use of screws, clips, etc.

The essence of this invention is combining the use of magnetostrictive expanding and contracting materials in an electromagnetic device, apparatus or machine to virtually eliminate the adverse effects of magnetostrictive and Joule effects. This invention is not material-dependent as long as the effect of virtual cancellation of magnetostrictive expansion and contraction is achieved. Some of the materials that can be used include but not limited to iron for expansion and nickel for contraction. The configuration and pattern of lamination can take various forms and arrangements. The ratio of each material can vary, including but not limited to five sheets of iron to every sheet of nickel.

The practice of this invention is of course not limited to the first and second embodiments as shown by way of examples. This invention can be practiced in all electromagnetic devices, apparatuses and machines, including but not limited to a stator core, a rotor core, a transformer core, a solenoid core, an alternator core and a generator core. It is apparent that the practice of this invention can take various shapes and sizes depending upon the application.

I claim:

1. A core, comprising:
   a plurality of sheets made of a first material that are laminated together to form a main block of the core; and
   a plurality of teeth made of a second material;
   wherein the plurality of teeth is attached to the main block;
   wherein (a) the first material is a magnetostrictive expanding material and the second material is a magnetostrictive contracting material, or (b) the first material is a magnetostrictive contracting material and the second material is a magnetostrictive expanding material;
   wherein the core is constructed of the two materials that magnetostrictively counteract one another under the influence of a magnetic field such that the core undergoes about no net change in size due to the magnetostrictive effect.

2. The core of claim 1, wherein the main block comprises an interior perimeter.

3. The core of claim 1, wherein each tooth is substantially rectangular in shape having a set of opposing edges each with a groove.

4. The core of claim 3, further comprising a plurality of L-shaped couplers each having a tongue mated for the groove.

5. The core of claim 4, wherein the plurality of teeth is attached to the main block by transversely mounting each tooth to the interior perimeter of the main block by inserting each tongue into each groove.

6. The core of claim 5, wherein each coupler is fastened to the main block.

7. The core of claim 6, wherein the each of the plurality of teeth are separated equal distance apart from each other forming a plurality of slots therebetween.

8. The core of claim 1, wherein the first material comprises nickel and the second material comprise iron.

9. The core of claim 1, wherein the first material comprises iron and the second material comprises nickel.

10. The core of claim 1, wherein the core is an electromagnetic core for a device selected from the following, a motor, a stator, a rotor, a transformer, a solenoid, a relay, a generator and an alternator.

11. The core of claim 1, wherein a ratio of an amount of the first material to an amount of the second material is about five to one (5:1) or about one to five (1:5).

12. A core, comprising:
    a plurality of magnetostrictive contracting sheets; and
    a plurality of magnetostrictive expanding sheets;
    wherein the magnetostrictive contracting sheets and the magnetostrictive expanding sheets are laminated together to form the core,
    wherein the core is constructed of the two materials that magnetostrictively counteract one another under the influence of a magnetic field such that the core undergoes about no net change in size due to the magnetostrictive effect.

13. The core of claim 12, wherein the core comprises an interior portion having a plurality of teeth.

14. The core of claim 13, wherein the teeth are separated an equal distance apart from each other to form a plurality of slots therebetween.

15. The core of claim 12 wherein a ratio of a number of the magnetostrictive expanding sheets and a number of the magnetostrictive contracting sheets is five to one (5:1).

16. The core of claim 12 wherein there is one magnetostrictive contracting sheet adjacent every five magnetostrictive expanding sheets.

17. The core of claim 12 wherein each magnetostrictive expanding sheet is about five time thicker than each magnetostrictive contracting sheet.

18. The core of claim 12, wherein the core is an electromagnetic core for one of a motor, a stator, a rotor, a transformer, a solenoid, a relay, a generator and an alternator.

19. The core of claim 12, wherein the magnetostrictive contracting sheets comprise nickel and the magnetostrictive expanding sheets comprise iron.

20. A core, comprising:
   a plurality of magnetostrictive contracting sheets having a plurality of teeth protruding from an interior perimeter; and
   a plurality of magnetostrictive expanding sheets having a plurality of teeth protruding from an interior perimeter;
   wherein the magnetostrictive contracting sheets and the magnetostrictive expanding sheets are laminated together to form the core,
   wherein the core is constructed of the two materials that magnetostrictively counteract one another under the influence of a magnetic field such that the core undergoes about no net change in size due to the magnetostrictive effect.

21. The core of claim 20, wherein a ratio of a number of the magnetostrictive expanding sheets and a number of the magnetostrictive contracting sheets is five to one (5:1).

22. The core of claim 20, wherein there is one magnetostrictive contracting sheet adjacent every five magnetostrictive expanding sheets.

23. The core of claim 20, wherein each magnetostrictive expanding sheet is about five times thicker than each magnetostrictive contracting sheet.

24. The core of claim 20, wherein the magnetostrictive contracting sheets comprise nickel and the magnetostrictive expanding sheets comprise iron.

25. The core of claim 20, wherein the core is an electromagnetic core for one of a motor, a stator, a rotor, a transformer, a solenoid, a relay, a generator and an alternator.

26. A core, comprising:
   a plurality of sheets made of a first material that are laminated together to form a main block of the core; and
   a plurality of teeth made of a second material;
   wherein the plurality of teeth is attached to the main block;
   wherein (a) the first material is a magnetostrictive expanding material and the second material is a magnetostrictive contracting material, or (b) the first material is a magnetostrictive contracting material and the second material is a magnetostrictive expanding material;
   wherein the core is constructed of the two materials that magnetostrictively counteract one another under the influence of a magnetic field such that the core undergoes a slight contraction due to the magnetostrictive effect.

27. The core of claim 26, wherein the main block comprises an interior perimeter.

28. The core of claim 28, wherein each tooth is substantially rectangular in shape having a set of opposing edges each with a groove.

29. The core of claim 28, further comprising a plurality of L-shaped couplers each having a tongue mated for the groove.

30. The core of claim 29, wherein the plurality of teeth is attached to the main block by transversely mounting each tooth to the interior perimeter of the main block by inserting each tongue into each groove.

31. The core of claim 30, wherein each coupler is fastened to the main block.

32. The core of claim 31, wherein each of the plurality of teeth are separated an equal distance apart from each other forming a plurality of slots therebetween.

33. The core of claim 26, wherein the first material comprises nickel and the second material comprise iron.

34. The core of claim 26, wherein the first material comprises iron and the second material comprises nickel.

35. The core of claim 26, wherein the core is an electromagnetic core for a device selected from the following: a motor, a stator, a rotor, a transformer, a solenoid, a relay, a generator and an alternator.

36. The core of claim 26, wherein a ratio of an amount of the first material to an amount of the second material is about five to one (5:1) or about one to five (1:5).

37. A core, comprising:
   a plurality of magnetostrictive contracting sheets; and
   a plurality of magnetostrictive expanding sheets;
   wherein the magnetostrictive contracting sheets and the magnetostrictive expanding sheets are laminated together to form the core,
   counteract one another under the influence of a magnetic field such that the core undergoes a slight contraction due to the magnetostrictive effect.

38. The core of claim 37, wherein the core comprises an interior portion having a plurality of teeth.

39. The core of claims 38, wherein the teeth are separated an equal distance apart from each other to form a plurality of slots therebetween.

40. The core of claim 37, wherein a ratio of a number of the magnetostrictive expanding sheets and a number of the magnetostrictive contracting sheets is five to one (5:1).

41. The core of claim 37, wherein there is one magnetostrictive contracting sheet adjacent every five magnetostrictive expanding sheets.

42. The core of claim 37, wherein each magnetostrictive expanding sheet is about five times thicker than each magnetostrictive contracting sheet.

43. The core of claim 37, wherein the core is an electromagnetic core for one of a motor, a stator, a rotor, a transformer, a solenoid, a relay, a generator and an alternator.

44. The core of claim 37, wherein the magnetostrictive contracting sheets comprise nickel and the magnetostrictive expanding sheets comprise iron.

45. A core, comprising:
   a plurality of magnetostrictive contracting sheets having a plurality of teeth protruding from an interior perimeter; and a plurality of magnetostrictive expanding sheets having a plurality of teeth protruding from an interior perimeter;

wherein the magnetostrictive contracting sheets and the magnetostrictive expanding sheets are laminated together to form the core, wherein the core is constructed of the two materials that magnetostrictively counteract one another under the influence of a magnetic field such that the core undergoes a slight contraction due to the magnetostrictive effect.

46. The core of claim 45, wherein a ratio of a number of the magnetostrictive expanding sheets and a number of the magnetostrictive contracting sheets is five to one (5:1).

47. The core of claim 45, wherein there is one magnetostrictive contracting sheet adjacent every five magnetostrictive expanding sheets.

48. The core of claim 45, wherein each magnetostrictive expanding sheet is about five times thicker than each magnetostrictive contracting sheet.

49. The core of claim 45, wherein the magnetostrictive contracting sheets comprise nickel and the magnetostrictive expanding sheets comprise iron.

50. The core of claim 45, wherein the core is an electromagnetic core for one of a motor, a stator, a rotor, a transformer, a solenoid, a relay, a generator and an alternator.

* * * * *